United States Patent [19]

Desilets et al.

[11] Patent Number: 4,527,819

[45] Date of Patent: Jul. 9, 1985

[54] FROST-FREE METAL HOSE CONSTRUCTION

[75] Inventors: Norman H. Desilets, Enfield, Conn.; Chester T. Gazda; Richard A. Zamachaj, both of Chicopee, Mass.

[73] Assignee: Titeflex Corporation, Springfield, Mass.

[21] Appl. No.: 531,945

[22] Filed: Sep. 13, 1983

[51] Int. Cl.³ .............................................. B23K 35/12
[52] U.S. Cl. ..................................... 285/287; 228/154; 228/258
[58] Field of Search ............... 228/154, 237, 258, 111, 228/172, 173 F; 285/115, 149, 287; 165/177, 178; 29/157 R, 157 T

[56] References Cited

U.S. PATENT DOCUMENTS

| | | |
|---|---|---|
| 2,142,357 | 1/1939 | Jacobson ............................ 285/149 |
| 2,473,879 | 6/1949 | Guarnaschelli ..................... 285/287 |
| 2,678,836 | 5/1954 | Courtot .............................. 285/149 |
| 3,528,688 | 9/1970 | Stenerson ......................... 228/56 R |
| 3,680,200 | 8/1972 | Terrill et al. ........................ 285/287 |
| 3,750,248 | 8/1973 | Morris ................................ 228/154 |
| 3,968,982 | 7/1976 | Belicic .............................. 228/56 R |

Primary Examiner—Kenneth J. Ramsey
Assistant Examiner—M. Jordan
Attorney, Agent, or Firm—Louis Bernat

[57] ABSTRACT

A braided hose which has a frost-free socket joint made by placing a ring of brazing material above the joint and heating the joint below the ring. This way, the brazing material flows into the joint so that its external and exposed edge of the joint is completely filled. If the capillary action of the molten solder is incomplete, any voids in the joint are exposed to the interior of the hose and not to the atmosphere. The socket is very shallow, in the order of one-half to one convolution of the hose.

10 Claims, 6 Drawing Figures

FROST-FREE METAL HOSE CONSTRUCTION

This invention relates to "frost-free" metal hose connections and fittings and more particularly, to means for and methods of making connections which do not have a shortened life and which are not unduly limited by metal fatigue.

An exemplary use for the invention is to provide means for and methods of applying fittings to the ends of hoses having a metal outer braid or sleeve. These fittings have often been made by a method which promoted both failure and a shortened lifetime. One reason for such failures has been an accumulation of moisture in voids in a joint between the braid and the fitting, followed by freezing, which expanded the moisture to crush either the hose or the fitting, or both. For example, if a joint is filled by molten metal flowing under capillary action, the molten metal may or may not flow to and overflow the exposed edge of the joint. At any place where the molten metal fails to reach such exposed edge, there is a void in which moisture may collect. A reason for the shortened lifetime has been a creation of a section of the braid which is solidified by the brazing material. All bending tends to become concentrated in or at the end of the solidified braid section, leading to an early failure because there is metal fatigue growing out of such concentrated bending.

Accordingly, an object of the invention is to provide new and improved fittings on braid tubes, which are "frost-free", which do not collect moisture, and which are not given to early metal fatigue. Here, an object is to provide fittings for convoluted hoses having an outer metal braided cover.

In keeping with an aspect of the invention, these and other objects are accomplished by providing a brazing socket at the end of a fitting. The socket has an inside diameter which almost exactly receives the outside diameter of the braid over a convolution hose, with only enough space to accept a liquid brazing material. The length of the socket is approximately equal to the height of between one-half and one convolution of the hose. For most hoses, this means that the depth of the socket is in the range between ¼" and 1/32". For the average hose, the preferred socket depth is approximately 1/16". A ring of silver brazing material or solder is placed on top of the socket (i.e. at the exposed joint) and over the joint or space between the braid and the socket. An induction heater is placed below the silver material to melt and draw the liquid-state solder down and into the socket joint. This way the entire diameter of the exposed joint is filled with the molten metal. If any voids grow out of insufficient of incomplete capillary action, they are exposed to the interior of the hose and not to the atmosphere.

The preferred device and method of making it is seen in the attached drawings, wherein.

Figure 1:
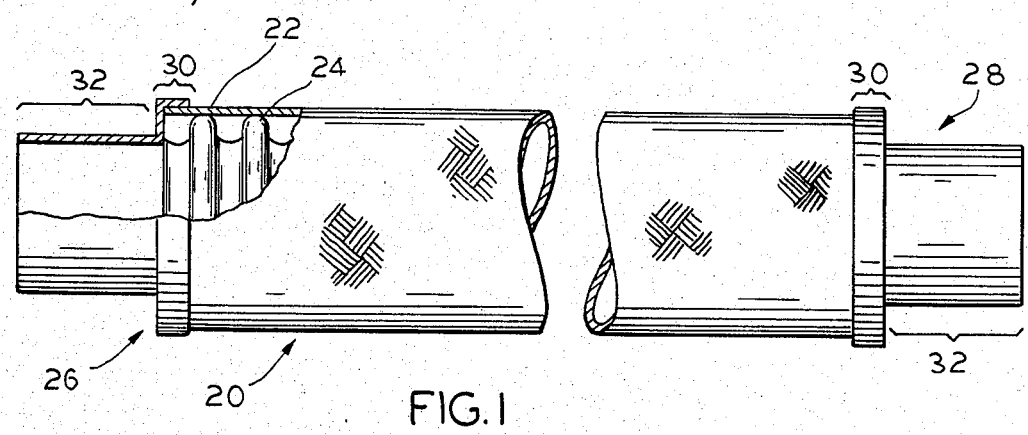
FIG. 1 is a side elevation, partly broken away, showing a hose with a pair of end fittings.

In FIG. 1, a braided hose 20 may take any suitable form. For present purposes, the only important feature is that the braid 22 is a material which may be brazed, preferably with a silver solder or other suitable brazing material. Inside the braid, the hose has a convoluted liner 24. Typically, a hose such as this should not leak at 750 PSI, for example.

The overall length of the hose is not important; in one example, it may be in the order of 15 to 20 inches. The outside diameter of the hose 20 may be up to about 1.650 inches and the inside diameter may be about 1.25 inches.

Each end of the hose terminates in a fitting 26, 28. Each of the fittings comprises a socket part 30 and another or connector part 32. The socket part has an inside diameter which receives the outside diameter of the hose braid, with enough separation to form a joint into which molten metal may flow under capillary action. The other or connector part could be anything suitable, such as a threaded member, a solder sleeve, a bayonett connector, or the like.

An important problem which has occurred in the past is that moisture has accumulated in the joint between the outside of the braid 22 and the inside of the socket 30. This moisture has then frozen, sometimes with a resultant expansion which as destroyed the socket, the hose, the brazed material joining the two, or combinations thereof. Another problem is that the brazing technique has resulted in a build up of brazing material which has sometimes interfered with fluid flow or has shortened the life of the hose. The invention overcomes these and similar problems.

Figure 2:
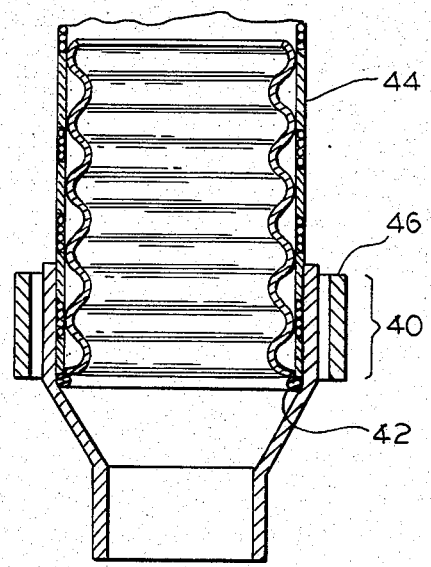
FIG. 2 is a cross-section of a prior art hose, a socket, a ring of solder, and an induction heater for melting the solder.
Figure 3:
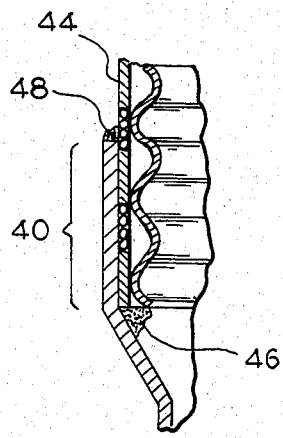
FIG. 3 is a cross-section of a prior art hose and fitting attached to the braid of such hose, in the prior art manner that is taught by FIG. 2.

The prior art method of attaching the sockets to the hoses is shown in FIGS. 2, 3. Heretofore, the socket part 40 has been fairly deep, extending over a number of convolutions of the hose.

To make this prior art joint, a ring of the silver brazing material 42 (FIG. 2) was first placed in the bottom socket 40. Then, the braid 44 on the hose is slipped into the socket and pushed down on top of the ring of silver brazing material. An induction heater 40, heats the ring of silver brazing material 42 to a liquid-state. Capillary action draws the liquid silver into the joint area on space between the braid 44 and the socket 40. Since capillary action is a random event, it is not easy to predict that 100% of the joint will always be filled. Sometimes, an exposed edge of the joint may have no metal in it, so that there is a void in which moisture may collect. Some of the liquid silver solder runs down and out of the joint, to form an accumulation at 46, near the bottom of the hose. Other of the liquid silver solder may climb out of the joint and forms a rigid build up 48 at the top of the socket 40. Both of the build ups 46 and 48 represent a waste of silver material, and in some cases, it may interfere with fluid flow within the hose.

It has been discovered that these and other problems occur because the usual joint area of socket 40 was, perhaps, a half of an inch deep. A very large amount of silver solder is required to make the joint. A long time is required for the heating step. A substantial amount of heat, and therefore an expensive heater, was required. The joint did not fill perfectly because capillary action is not 100% dependable. Thus, some areas of the joint would not be completely wetted by the molten solder, leaving space for moisture to accumulate, especially when a flow of a fluid through the hose caused rapid cooling and heavy condensation on the outside of the hose.

At the bottom of the fitting, solder build up 46 occasionally restricted or interferred with a fluid flow within the tube. The build up 48 at the top tended to concentrate bending stress at particular places in the braid. Alternatively, bending occurred in the silver brazing material. Both of these events caused a shorter fatigue life for the braid.

Figure 5:
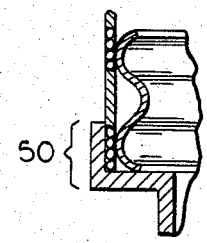
FIG. 5 is a cross-section of the inventive fitting showing a minimum depth socket.
Figure 6:
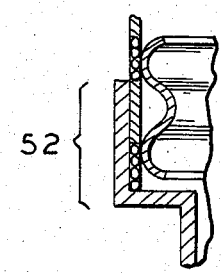
FIG. 6 is a similar cross-section showing the maximum depth of the socket.

The inventive method greatly reduces the depth of the socket to a vertical distance which is in the range of one-half to one convolution. The minimum depth 50 (FIG. 5) of the socket is 1/32-inches and the maximum depth 52 (FIG. 6) of the socket is a quarter inch. A sixteenth of an inch is a preferred depth for many, if not most, hoses of the described type.

The socket is preferably made of seamless copper or brass tubing, which is flared in the socket region. The ring 54 of silver brazing material has a diameter equal to the inside diameter of socket 50, and preferably, a cross-section diameter of about 1/16 inch.

Figure 4:
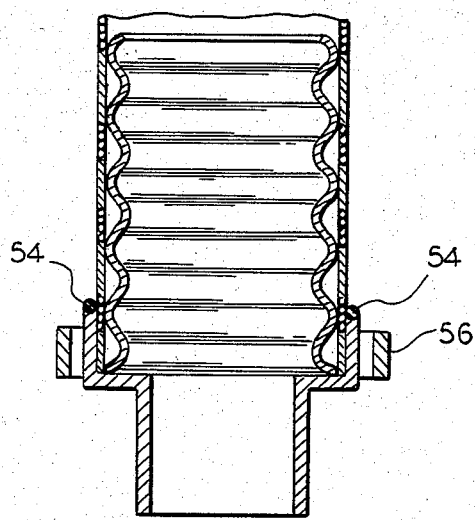
FIG. 4 is a cross-section of a hose, a ring of silver brazing material or solder, a fitting, and an induction heater for melting the silver solder according to the invention.

According to the invention, the ring 54 (FIG. 4) of silver brazing material is placed on top of the socket. The socket is placed in the induction heater 56 in a position such that the heater is below the silver material, to draw the liquid silver solder down and into the joint area, between socket and braid. Therefore, the top of the joint is sealed. The capillary action causes the liquid solder to flow down into the joint and away from the braid above the joint. If there are any voids in the joint, they are not exposed to the atmosphere and they are kept free of moisture by a flow of fliud within the tube. There is no build up of the silver brazing material at the top or the bottom of the joint, as at 46, 48 (FIG. 3). Moreover, the shorter socket and the inventive process require less silver brazing metal. Since there is no saturation with molten metal at the exposed braid where bending may occur, there is no undue metal fatigue.

Those who are skilled in the art will readily perceive how to modify the invention. Therefore, the appended claims are to be construed to cover all equivalent structures which fall within the scope and the spirit of the invention.

What is claimed:

1. A braided hose having a frost-free connector, said hose comprising a convoluted liner having a braid covering, said frost-free connector comprising a socket part having a depth equal to the length of one-half to one convolution and an inside diameter approximately equal to the outside diameter of said braid, said socket being fitted over the end of said hose whereby there is a joint between the outside of said braid and the inside of said socket, and a brazing material surrounding the outside and exposed joint between said braid and said socket, said brazing material being drawn into said joint by capillary action while said brazing material is molten, whereby any voids in said molten material within said joint resulting from incomplete capillary action are exposed to the interior and not the exterior of said joint.

2. The device of claim 1 wherein the depth of said socket is between 1/32 and ¼-inch.

3. The device of claim 2 wherein said socket is seamless copper tubing and said brazing material is a silver brazing material.

4. A process of making a frost-free connection between a braided hose having a convoluted liner and a seamless socket, said method comprising the steps of:
   (a) forming a seamless tubing into a socket having a depth in the range of one-half to one convolution of said liner, the inside diameter of said socket being approximately the same as the outside diameter of said braid;
   (b) placing an end of said braid and said liner into said socket,
   (c) placing a ring of brazing material on top of said socket and over the joint between said braid and said socket; and
   (d) heating the outside of said socket below the level of said ring of brazing material, whereby capillary action draws said brazing material down into said joint to completely seal the top of the joint and prevent an entry of moisture into any voids otherwise caused by an incomplete capillary action.

5. The process of claim 1 wherein the depth of said socket is in the range of 1/32 to ¼ inch.

6. The process of claim 1 wherein the depth of said socket is 1/16-inch.

7. The process of claim 1 wherein said tubing of step (a) is copper tubing.

8. The process of claim 1 wherein said brazing material of step (c) is a silver brazing material.

9. The process of claim 1 wherein the heating of step (d) is carried out by an induction heating.

10. A product made by the process of claim 1.

* * * * *